April 6, 1937. C. G. STRANDLUND 2,076,051
PLOW
Filed July 6, 1936 2 Sheets-Sheet 1
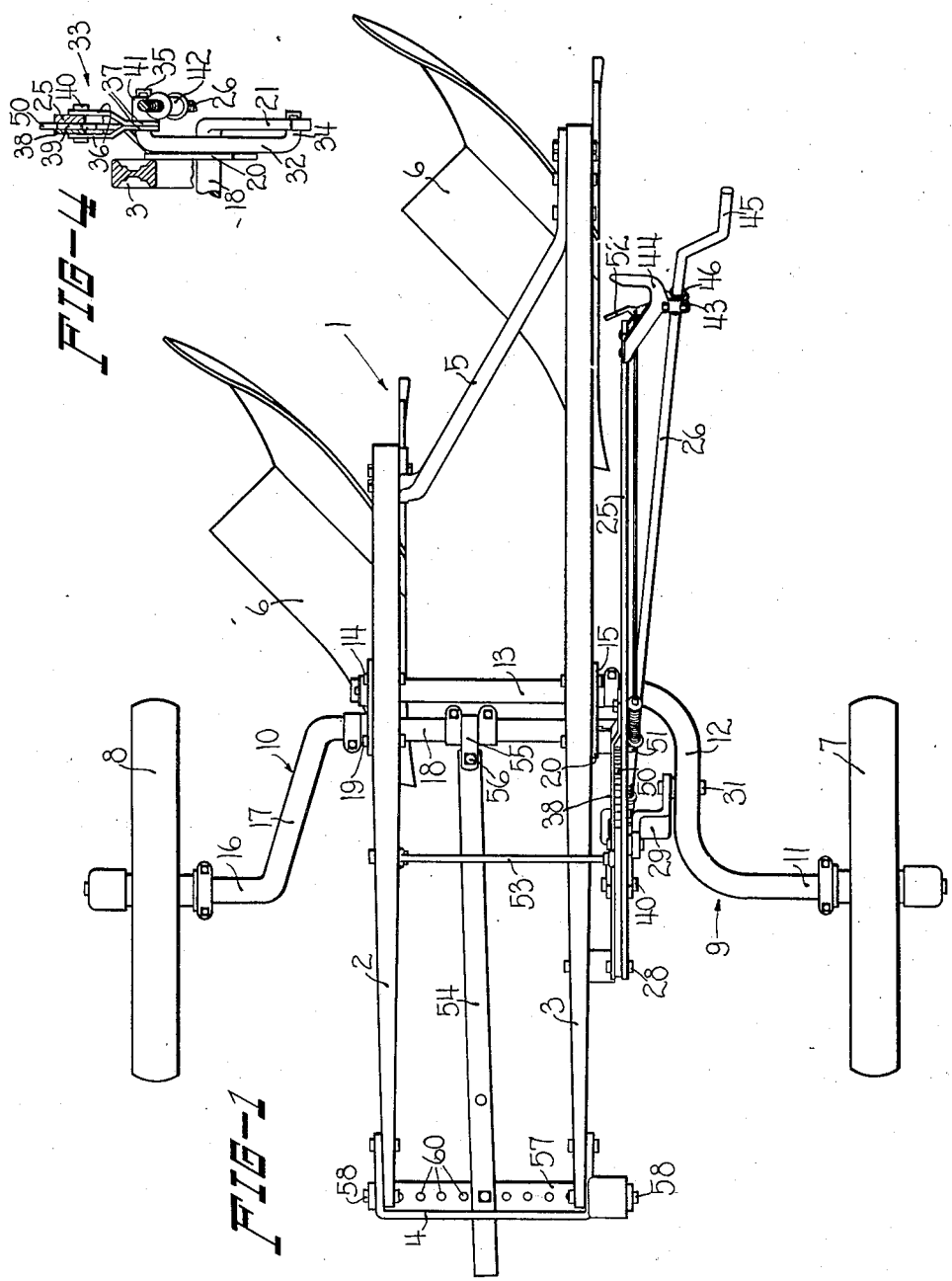
INVENTOR
CARL G. STRANDLUND.
BY
ATTORNEY

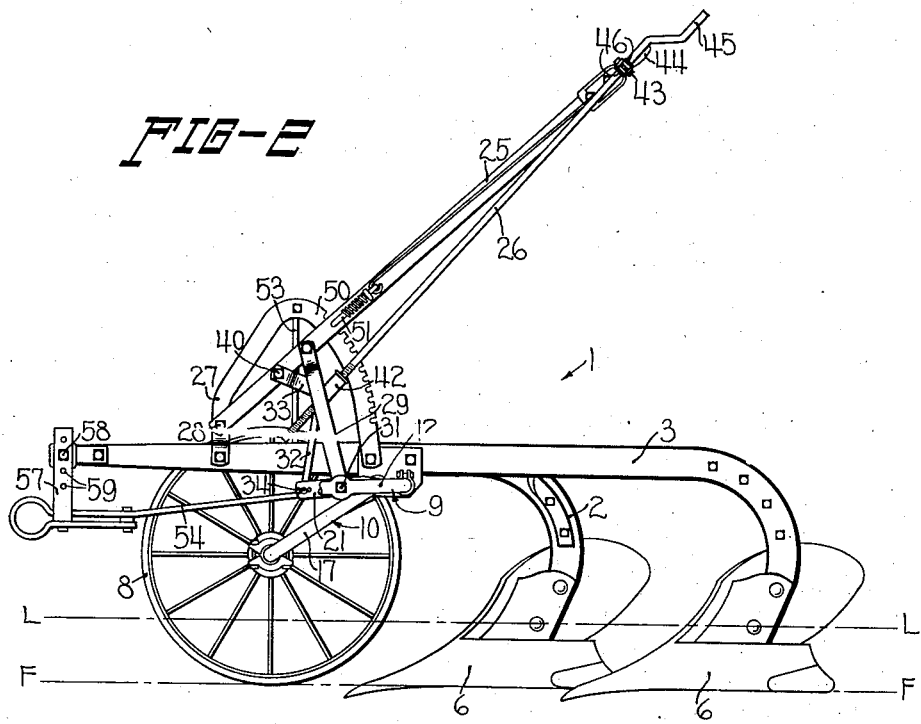
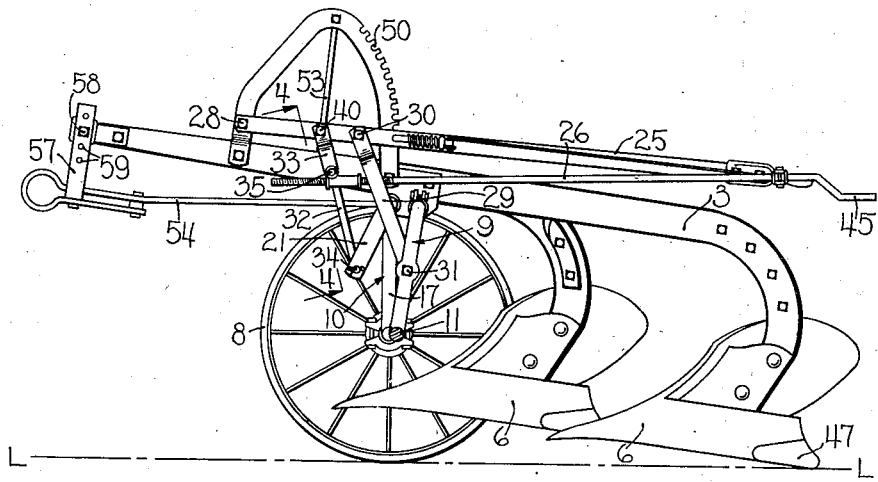

Patented Apr. 6, 1937

2,076,051

UNITED STATES PATENT OFFICE 2,076,051

PLOW

Carl G. Strandlund, Moline, Ill., assignor to Deere & Company, Moline, Ill., a corporation of Illinois Application July 6, 1936, Serial No. 89,064

13 Claims. (Cl. 97—103)

The present invention relates generally to plows and more particularly to a simplified and improved lifting mechanism for plows of the type which have a single control lever for lifting the plow from plowing position to transport position, and an auxiliary control for leveling the plow into plowing position.

Heretofore one of the difficulties encountered with plows of this type was that in certain plowing operations when the plow was lifted to transport position, the operation of the lifting mechanism was inherently accompanied by a lateral tilting of the plow. This was especially troublesome when the plow was set for "opening" the field, which requires the wheels to run on the same level with the plow working at normal depth. In some cases this tilting was severe enough to cause part of the plow body to scrape on the ground.

It is the object of the present invention to provide a lifting and leveling mechanism by which the plow can be lifted to a level transport position, regardless of the setting of the leveling mechanism in the plowing position.

Another object is to provide a simplified control mechanism having but a single control lever for the routine raising and lowering of the plow and a different type of auxiliary control means, such as a screw device for the infrequent operation of leveling, thus differentiating between the controls to simplify the operation thereof.

Another object is to combine and coordinate the mechanism so that the two control handles are always close together in a convenient operating position.

In accomplishing these objects I have applied the principle that when mechanical linkage is in dead-center relation, an appreciable angular displacement effects but little translatory movement. By providing mechanism that is in dead-center relation when the plow is in transport position, but otherwise when in plowing position, angular adjustments of the linkage in the latter position effect an appreciable level-correcting movement, but have little effect on the mechanism in transport position.

The method of applying this principle in a plow lifting mechanism will now be explained in a manner clear to those skilled in the art, in which reference is made to a specific embodiment shown in detail in the drawings appended hereto in which—

Figure 1 is a plan view of a plow embodying the principles of my invention;

Figure 2 is an elevation of the plow adjusted to a plowing position with the land wheel broken away for purposes of simplicity;

Figure 3 is an elevation showing the plow in transport position with the land wheel broken away; and, Figure 4 is a section taken along the line 4—4 of Figure 3.

Referring now to the drawings, reference numeral 1 indicates a plow of the horse-drawn type, which is controlled from the rear, the operator generally walking behind the plow, from which position he drives the horses and operates the controls. The plow comprises a frame which consists of a pair of laterally spaced beams 2, 3 of conventional shape, which are rigidly connected by a forward brace 4 and a rear brace 5. Each of the beams supports a plow body 6 in the usual manner. The beams are supported on a pair of ground wheels 7, 8, which are journaled on crank axles 9, 10, respectively.

The land wheel crank axle 9 comprises a laterally extending axle portion 11, a crank portion 12 disposed at right angles to the axle portion, and terminates in a supporting portion 13 which is parallel to the axle portion 11 and journaled in bearings 14, 15 on the beams 2, 3, respectively. The furrow wheel crank axle 10 has a similar axle portion 16, a crank portion 17, and a supporting portion 18 journaled on the beams 2, 3 in bearings 19, 20, respectively. The last-mentioned crank axle 10 extends through the bearing 20 and terminates in a crank arm 21 which is disposed at right angles to the supporting portion 18.

It will be understood by those skilled in the art that the frame of the plow can be raised and lowered with respect to the wheels by rotating the crank axles 9 and 10. Also, by rotating one of the crank axles relative to the other, a difference in elevation between the two wheels can be provided. Thus when the plow is disposed in a normal plowing position, as shown in Figure 2, the furrow wheel 8 runs at the bottom of the furrow on a level indicated by the line F—F, while the land wheel runs on the unplowed ground on the level indicated by the line L—L. Although the land wheel is not shown in Figure 2, the crank portion 12 of its crank axle 9 is shown to indicate its position.

The plow is raised and lowered by a lifting lever 25 and is leveled by an adjusting rod 26. The lifting lever 25 is pivoted on an upright support 27 by means of a pivot bolt 28, permitting pivotal motion in a vertical longitudinal plane with respect to the frame. The lifting lever is connected to the crank portion 12 of the land wheel crank axle 9 by a single link member 29 which is pivotally connected to the lifting lever by a bolt 30 and pivotally connected to the crank 12 by a bolt 31. The lifting lever is also connected to the crank arm 21 of the furrow wheel crank axle 10 by a pair of serially joined links 32, 33.

Details of this connection are shown on a larger scale in Figure 4. The lower link 32 comprises a rod terminating at each end in a short bearing portion 34, 35 disposed at right angles to the body of the link. The lower bearing portion 34 is inserted through an aperture in the crank arm 21 and is secured by suitable means, such as a cotter. The upper bearing portion 35 is inserted through aligned holes in the juxtaposed ends 37 of a pair of strap members 36 which constitute the upper link 33. The strap members 36 diverge to receive between them the lifting lever 25 and a strap 38, which is disposed parallel to and is attached to the lever 25, but spaced therefrom by a short spacer 39. The straps 36 are connected to the lever 25 and strap 38 by a pivot bolt 40 which extends through aligned openings in the several members.

The leveling rod 26 is connected to the linkage at the pivot joint between the serially connected links 32, 33 for the purpose of fixing the position of this joint relative to the lifting lever 25, as will be explained later. This connection is made by means of an internally threaded collar 42 which engages the threaded end of the leveling rod 26, the collar having a lateral extension 41 which provides a journal which embraces the upper bearing portion 35 of the lower link 32, and is secured by a suitable cotter or the equivalent.

The other end of the level adjusting rod 26 is provided with a crank 45 by means of which the rod may be rotated. In order that the adjusting crank 45 be disposed convenient to the operator at all times, it is supported in a journal bearing 43 on the handle 44 of the lifting lever 25. Thrust collars 46 are provided at each end of the bearing 43 to prevent axial movement of the rod 26.

It is to be noted that the lever 25, the rod 26, and the link 33 complete a triangle, the angles of which can be adjusted by screwing the rod 26 in the collar 42, causing the latter to move longitudinally on the rod. A limited amount of angular play in the bearing 43 is provided to permit variations in the angle between the lever and the rod during adjustment. Obviously, however, in adjusted position of the rod 26 this triangle is substantially rigid so that the position of the pivot between the two links 32, 33 is fixed relative to the pivot 28 of the lever 25.

An adjustment of the lifting lever 25 around its fulcrum 28 operates on the land wheel link 29 with a lever arm of fixed length equal to the distance between the pivots 28 and 30, which thereby swings the crank axle 9 through a range which is not affected by adjustments of the leveling rod 26.

The link 32 connected to the furrow wheel crank axle 10 is operated by a lever arm of a length corresponding to the distance between the pivots 28 and 35. This distance can be adjusted by means of the adjusting rod 26, which causes the link 33 to pivot around the bolt 40.

In the transport position, as illustrated in Figure 3, both of the crank portions 12, 17 of the crank axles, 9, 10, respectively, are substantially vertically disposed, thus providing the maximum lift on each axle. In this position the frame is lifted sufficiently to raise the plow bodies 6 clear of the ground, except that, due to the unbalanced weight of the plow, the rear end 47 of the rear plow body 6 rests on the ground. In this position, the pair of serially connected links 32, 33 are substantially in longitudinal alignment, end to end, and are approximately parallel to the other link 29. The lifting lever 25 extends substantially horizontally rearward from its pivot support 28.

Inasmuch as the links 32, 33 are substantially in a dead-center relation, the three pivot points 34, 35, 40 being substantially in alignment, it is evident that a reasonable amount of adjustment of the leveling rod 26 will effect but little change in the straight line distance between the two end pivot points 34, 40 and, therefore, but little angular displacement of the crank arm 21 of the furrow wheel crank axle 10. This dead-center effect is multiplied by the dead center relation due to the vertical position of the axle arm 17 so that the resultant vertical displacement of the frame is very small indeed.

For example, assume that the adjusting rod 26 be rotated to move the member 42 to the left as viewed in Figure 3. This would cause the lever arm 21 to rotate clockwise, but to a very limited extent. This effects a similar clockwise rotation of the axle arm 17, but as it practically vertical or on dead-center, there is but a negligible amount of vertical displacement of the support portion 18 of the crank axle 10, with a corresponding negligible amount of tilting of the implement frame.

As the lifting lever 25 is raised around its pivot 28, both of the crank axles 9, 10 are rotated clockwise by the links, and as the cranks depart from the vertical position and approach a forwardly extending horizontal position, the rate of downward motion of the frame increases. However, as the lengths of the linkages and their distances from the lever pivot 28 are different, the rates of rotation of the crank axles 9, 10 are also different, so that at other positions of adjustment of the lifting lever, the angles between each of the cranks and the beams 2, 3 are relatively different, as indicated in Figure 2 which shows the plow set for nearly its maximum depth of plowing.

Now, in plowing position, it is evident that an adjustment of the leveling rod 26 effects a much greater adjustment of the crank arm 21 inasmuch as the rod 26 and the link 32 are more nearly in alignment. Furthermore, as the crank 17 of the axle 10 is more nearly horizontal, an angular movement thereof effects a much more appreciable vertical displacement of the furrow wheel 8 relative to the frame than when it is in the transport position.

For each setting of the lever 25, which adjusts the depth of plowing, there is a different setting of the leveling rod 26, inasmuch as the furrow wheel 8 must always run at the bottom of the furrow on a level with the bottoms of the plow bodies 6, with the exception that when a field is being opened, the first furrow must be plowed with both wheels on the land level L—L. In this case the furrow wheel must be raised from the position shown in Figure 2 by moving the member 42 upward on the rod 26 toward the handle 45.

The lifting lever 26 can be set and held in several positions throughout its range by a notched sector 50, fixed to the beam 3, which cooperates with a latch 51 operated by a lever 52 on the handle 44 in conventional manner. The sector 50 extends through the space between the lever 25 and the strap member 38, thus acting as a lateral brace for the lever. The sector is connected across to the beam 2 by a lateral brace 53.

It is also to be noted that the rod 26 and link 33 provide a truss-like reinforcement for the lever 25 which has a stiffening effect, thus preventing any whipping action of the lever, which has been known in some cases to bend or break the lever.

A drawbar 54 is connected to the transverse supporting portion 18 of the crank axle 10 by means of a journal bearing 55 and pivot bolt 56. The forward end of the drawbar is carried on a U-shaped bracket 57 which is supported by bolts 58 on the two beams 2, 3. The height of the drawbar can be regulated to some extent by bolting the bracket 57 in any of several holes 59. The lateral adjustment of the drawbar is effected by fixing its position by bolting it through any of several holes 60 in the bracket 57.

I do not intend my invention to be limited to the particular details herein shown and described, except as set forth in the following claims.

I claim:

1. In a plow, the combination with a plow body carrying frame, of a pair of axle arms connected to said frame for swinging movement, a ground wheel on each axle arm, means for adjusting the depth of plowing comprising an adjusting lever, and link means for connecting said lever to each of said axle arms, a level adjusting rod, means for supporting one end of said rod on said lever, and means for engaging the other end of said rod with said link means.

2. In a plow, the combination with a plow body carrying frame, of a pair of axle arms connected to said frame for swinging movement, a ground wheel on each axle arm, a lifting lever pivoted to said frame, link means connecting said lever with each of said axle arms, whereby pivoting said lifting lever adjusts said wheels simultaneously vertically relative to said frame, a level adjusting member adjustable longitudinally of said lever and connected with said link means, for adjusting one of said wheels relative to the other.

3. In an implement having a frame and a ground-working tool mounted thereon, a pair of crank axles swingably supported thereon, a ground wheel on each of said crank axles, a lifting lever pivoted to said frame, link means connecting said lever with each of said crank axles, one of said link means having a pivot joint intermediate between its connections to said lever and said crank axle, and means for adjusting the position of said intermediate joint generally transversely with respect to a straight line between said connections of said link means, thereby varying the distance therebetween to adjust the elevation of one of said wheels relative to the other.

4. In an implement having a frame and a ground-working tool mounted thereon, a pair of crank axles swingably supported thereon, a ground wheel on each of said crank axles, a lifting lever pivoted to said frame, link means connecting said lever with each of said crank axles, one of said link means comprising a pair of serially jointed arms, and means for adjustably fixing the position of one of said arms relative to said lifting lever, for adjusting the angular position of the respective crank axle.

5. In an implement having a frame and a ground-working tool mounted thereon, a pair of crank axles supported on said frame for swinging movement, a lifting lever having a fulcrum support disposed on said frame, a pair of link members, one of said members being pivotally connected to each of said crank axles, respectively, means for operatively connecting one end of each of said members with said lifting lever, and means for adjusting the distance between said end of one of said link members and said fulcrum support.

6. In a plow, the combination with a plow body carrying frame, of a land wheel and a furrow wheel, a crank axle for each wheel, each of said crank axles being swingably mounted on said frame, a lifting lever having a pivot support on said frame, a link connecting said lever with said land wheel crank axle, a second link pivotally connected to said furrow wheel crank axle, a third link having one end pivotally connected to said lever, the other end being pivoted to said second link, and means for adjustably fixing the position of said third link relative to said lever, for varying the distance between said pivot support of the lever and the pivotal connection between said second and third links, whereby a movement of said lever about its pivot adjusts both of said crank axles angularly relative to said frame, while an adjustment of said third link relative to said lever independently adjusts said furrow wheel crank axle angularly relative to said frame.

7. In a plow, the combination with a plow body carrying frame, of a land wheel and a furrow wheel, a crank axle for each wheel, each of said crank axles being swingably mounted on said frame, a lifting lever having a pivot support on said frame, a link connecting said lever with said land wheel crank axle, a second link pivotally connected to said furrow wheel crank axle, a third link having one end pivotally connected to said lever, means for pivotally connecting the other end of said third link to said second link, a level adjusting rod having a threaded portion, means cooperable with said threaded portion, engaging said pivotally connected links adjacent to the connecting means thereof, and a journal for supporting one end of said level adjusting rod on said lifting lever, whereby pivotal movement of said lifting lever simultaneously adjusts both of said crank axles angularly relative to said frame, and a rotation of said rod about its longitudinal axis independently adjusts the furrow wheel crank axle relative to said frame, thus adjusting the frame angularly laterally relative to the ground.

8. In a plow, the combination with a plow body carrying frame, of a land wheel and a furrow wheel, a crank axle for each wheel, each of said crank axles being swingably mounted on said frame, a lifting lever pivoted to said frame for adjusting the elevation of said frame between a position of maximum plowing depth and a transport position, a level adjusting member for adjusting said frame angularly laterally at any adjustment of depth within the range of said lever, and means operatively connecting said lever and said level adjusting member with said crank axles, whereby returning said lifting lever to transport position from any plowing position, lifts the frame to a substantially level transport position, regardless of the setting of said level adjusting member.

9. In a plow, the combination with a plow body carrying frame, of a land wheel and a furrow wheel, a crank axle for each wheel, each of said crank axles being swingably mounted on said frame, a lifting lever pivoted to said frame, a link connecting said lever to one of said crank axles, a pair of serially connected links connecting said lever to the other of said crank axles, whereby the elevation of said frame can be adjusted by means of said lever, between a position of maximum plowing depth and a transport position, and means for adjustably setting the angle between said pair of links at any position of adjustment of said lever for angularly adjusting one of said crank axles independently of the other crank axle, to adjust said frame angularly laterally, the angle between said pair of links being approximately 180 degrees when said lever is set in transport position but appreciably less than 180 degrees when said lever is pivoted into a plowing position, so that the effect of an adjustment of said angle is relatively small when said lever is in transport position as compared to the effect when said lever is in a plowing position, so that said frame assumes a substantially level transport position regardless of its angular relation when in plowing position.

10. In a plow, the combination with a plow body carrying frame, of a land wheel and a furrow wheel, a crank axle for each wheel, each of said crank axles being swingably mounted on said frame, a lifting lever pivoted to said frame, linkage mechanism connecting said lever to each of said crank axles, whereby the elevation of said frame can be adjusted between a position of maximum plowing depth and a transport position by a pivotal movement of said lever, and level adjusting means for transmitting to said mechanism a movement generally longitudinally of said lever for angularly adjusting one of said crank axles independently to adjust said frame angularly laterally to a level position during normal plowing with a suitable difference in elevation between said furrow wheel and said land wheel, said linkage mechanism and said crank axles being disposed in such a substantially dead-center relation when said lever is in transport position, that adjustment of said level adjusting means has a negligible effect upon the angular position of said frame when raised into transport position.

11. In an implement having a frame and a ground working tool mounted thereon, a pair of crank axles swingably supported on said frame, a ground wheel on each of said crank axles, a lifting lever pivoted to said frame, a link pivotally connected at one end thereof to said lifting lever and at the other end to one of said crank axles, a second link connected to the other of said crank axles, a third link connected between said second link and said lifting lever, and means for adjustably fixing the position of said third link relative to said lifting lever, said second and third links being disposed at an angle of substantially 180 degrees when said lifting lever is set in maximum lifting position, said angle decreasing as the lifting lever is moved toward its other extremity of movement.

12. In a plow, the combination with a plow body carrying frame of a land wheel and a furrow wheel, a crank axle for each of said wheels, each of said crank axles being swingably mounted on said frame, a lifting lever having a pivot support on said frame, a link connecting said lever with said land wheel crank axle, a second link connected to said furrow wheel crank axle, a third link connected to said lifting lever and pivoted to said second link, and means for adjustably fixing the position of said third link relative to said lever, whereby a movement of said lever about its pivot adjusts both of said crank axles angularly relative to said frame, and an adjustment of said third link relative to said lever adjusts said furrow wheel crank axle relative to said land wheel crank axle.

13. In a plow, the combination with a plow body carrying frame of a land wheel and a furrow wheel, a crank axle for each of said wheels, each of said crank axles being swingably mounted on said frame, a lifting lever having a pivot support on said frame, a link connecting said lever with said land wheel crank axle, a second link connected to said furrow wheel crank axle, a third link connected to said lifting lever and pivoted to said second link, and means for adjustably fixing the position of said third link relative to said lever, whereby a movement of said lever about its pivot adjusts both of said crank axles angularly relative to said frame, and an adjustment of said third link relative to said lever adjusts said furrow wheel crank axle relative to said land wheel crank axle, said second and third links being disposed substantially in alignment when said lifting lever is set in maximum lifting position, the angle between said last-mentioned links decreasing as said lifting lever is moved toward the opposite end of its range of movement, whereby the effect of said adjustment of said third link is comparatively greater when the plow is lowered than when it is lifted.

CARL G. STRANDLUND.